US009291100B2

(12) United States Patent
Mihara et al.

(10) Patent No.: US 9,291,100 B2
(45) Date of Patent: Mar. 22, 2016

(54) ROTARY MACHINE AND MOUNTING METHOD OF ATMOSPHERE RELIEF MECHANISM FOR ROTARY MACHINE

(71) Applicant: MITSUBISHI HEAVY INDUSTRIES, LTD., Tokyo (JP)

(72) Inventors: Ryoji Mihara, Tokyo (JP); Syota Fujii, Tokyo (JP); Hideki Fukumori, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 573 days.

(21) Appl. No.: 13/729,402

(22) Filed: Dec. 28, 2012

(65) Prior Publication Data

US 2013/0287549 A1    Oct. 31, 2013

(30) Foreign Application Priority Data

Apr. 27, 2012   (JP) ................... 2012-102267

(51) Int. Cl.
*F01D 25/24* (2006.01)
*F02C 7/00* (2006.01)

(52) U.S. Cl.
CPC . *F02C 7/00* (2013.01); *F01D 25/24* (2013.01); *Y10T 29/49234* (2015.01)

(58) Field of Classification Search
CPC ....... F17C 13/04; F16K 17/02; F16K 17/025; F16K 17/16; F16K 17/1606; F16K 17/1613; F16K 17/162; F16K 17/1626; F16K 17/1633; F01D 25/24; F01D 25/246; F01D 25/26; F01D 25/265; F05D 2240/14; F05D 2260/30; F05D 2260/31; F05D 2260/605
See application file for complete search history.

(56) References Cited

U.S. PATENT DOCUMENTS 4,207,913 A * 6/1980 Fike, Jr. ................. 137/68.23
4,232,513 A   11/1980 Pearson et al.
4,479,587 A   10/1984 Mundt et al.
(Continued)

FOREIGN PATENT DOCUMENTS

CN   101960101 A   1/2011
EP   0 083 473 A1   7/1983
(Continued)

OTHER PUBLICATIONS

International Search Report issued Mar. 26, 2013 in corresponding International Application No. PCT/JP2012/082847.
(Continued)

*Primary Examiner* — Craig Kim
*Assistant Examiner* — Adam W Brown
(74) *Attorney, Agent, or Firm* — Wenderoth, Lind & Ponack, L.L.P.

(57) ABSTRACT

A rotary machine is provided with a casing and an atmosphere relief mechanism (20) for closing an opening (12) for atmospheric release formed in the casing and relieving pressure of inner fluid to atmosphere when a pressure in the casing rises. The atmosphere relief mechanism includes: a rupture disc (24) configured to rupture when the pressure in the casing reaches a predetermined pressure; a pair of annular holding parts (22, 27) arranged to hold an outer edge of the rupture disc from both sides; a plurality of fastening members (29) for fastening the pair of annular holding parts to each other so as to hold the rupture disc between the pair of annular holding parts; and an annular spacer part (25) provided along an outer circumference of the rupture disc.

9 Claims, 5 Drawing Sheets

(56) References Cited

U.S. PATENT DOCUMENTS

| | | | |
|---|---|---|---|
| 5,222,862 A * | 6/1993 | Groenendaal et al. | 415/9 |
| 5,327,923 A * | 7/1994 | Eischen et al. | 137/15.17 |
| 6,609,878 B1 | 8/2003 | Ootoshi et al. | |
| 6,948,515 B2 * | 9/2005 | Wadkins | 137/68.23 |
| 8,800,300 B2 | 8/2014 | Hashimoto et al. | |
| 2003/0127132 A1 | 7/2003 | Turner et al. | |
| 2004/0025936 A1 | 2/2004 | Wadkins | |
| 2009/0314356 A1 | 12/2009 | Osumi et al. | |
| 2010/0242932 A1 | 9/2010 | Nakano et al. | |
| 2011/0005234 A1 | 1/2011 | Hashimoto et al. | |
| 2014/0311162 A1 | 10/2014 | Hashimoto et al. | |

FOREIGN PATENT DOCUMENTS

| | | |
|---|---|---|
| JP | 62-81771 | 5/1987 |
| JP | 2-126001 | 10/1990 |
| JP | 8-226308 | 9/1996 |
| JP | 11-44371 | 2/1999 |
| JP | 2007-205772 | 8/2007 |
| JP | 2010-4656 | 1/2010 |
| JP | 2010-121697 | 6/2010 |
| JP | 2010-270761 | 12/2010 |
| JP | 2011-246871 | 12/2011 |
| WO | 01/12955 | 2/2001 |

OTHER PUBLICATIONS

Concise explanation of relevance for Japanese Unexamined Utility Model Application Publication No. 62-81771, published May 25, 1987.

Decision to grant a patent issued Mar. 27, 2015 in corresponding Japanese Application No. 2012-102267 (with English translation).

Machine translation of Japanese Patent Application Publication No. 8-226308, published Sep. 3, 1996.

International Preliminary Report on Patentability issued Oct. 28, 2014 in corresponding International Application No. PCT/JP2012/082847 (with English translation).

Notice of Allowance issued Sep. 14, 2015 in corresponding Korean patent application No. 10-2014-7029333 (with English translation).

Notification of First Office Action issued May 19, 2015 in corresponding Chinese Application No. 201280072610.1 (with English translation).

* cited by examiner

ROTARY MACHINE AND MOUNTING METHOD OF ATMOSPHERE RELIEF MECHANISM FOR ROTARY MACHINE

BACKGROUND OF THE INVENTION

1. Technical Field

The present disclosure relates to a rotary machine provided with an atmosphere relief mechanism for preventing abnormal pressure rise in an interior space of a casing and also relates to a mounting method of the atmosphere relief mechanism.

2. Description of the Related Art

A rotary machine such as a steam turbine and a gas turbine includes a casing for housing a rotor so that working fluid (inner fluid) is hermetically sealed in an interior space of the casing. During normal operation of the rotary machine, normally there is a pressure difference between the interior space of the casing and an atmospheric side. For instance, some low-pressure casings of the steam turbine are configured so that a rotor being rotated upon receiving steam is covered by an inner casing and the rotor and the inner casing are covered by an outer casing. In this type of configuration, the casing forms an outer shell of the outer casing and the interior space of the casing functions as an exhaust chamber. The exhaust chamber is provided to introduce the steam (exhaust gas) having driven the rotor to a condenser and is maintained at negative pressure during normal operation of the steam turbine.

However, if the steam leaks from a piping or there is pump failure in a negative-pressure system arranged from the outer casing to the condenser, etc., the pressure in the interior space of the outer casing can increase abnormally. If this pressure exceeds atmospheric pressure, this causes abnormality in operation of the steam turbine and the condenser due to temperature rise of the steam and change in the pressure direction from external pressure to internal pressure, thereby making it inevitable to stop the operation. To avoid this, an atmosphere relief mechanism is provided to discharge the steam in the outer casing to the atmosphere when the exhaust pressure exceeds the atmospheric pressure.

Generally, the atmosphere relief mechanism used in the rotary machine is provided with a rupture disc configured to rupture when the pressure in the interior space of the casing exceeds a predetermined pressure. The rupture disc is configured to rupture when the pressure rises abnormally. Once the rupture disc ruptures, the interior space of the casing communicates with the atmosphere side to relieve the pressure of the interior space. Normally, the rupture disc is fixed by a holder to an opening for relieving to the atmosphere, which is formed in the casing. During a normal operation of the rotary machine, the opening is closed by the rupture disc to isolate the interior space from the atmosphere side.

As a related technique, disclosed in Japanese Unexamined Utility Model Application Publication No. 62-81771 is a mounting device for a floating disc for atmosphere relief provided in the steam turbine. This mounting device is configured to place the atmosphere relief disc made of a lead sheet at the opening of the casing and then fasten outer edge of the atmosphere relief disc to the casing by a holding disc and a bolt. Inside the atmosphere relief disc, the floating disc is provided so that, when the pressure inside the casing increases, the floating disc moves toward the atmosphere side and then causes shear failure of the lead sheet at the outer edge of the floating disc.

Further, in Japanese Unexamined Utility Model Application Publication No. 2-126001, as a rupture disc used in an exhaust casing of the steam turbine, metal plates made of stainless steel, lead, nickel aluminum, etc. are described.

In the case of using the lead plate as the atmosphere relief disc as described in JP 62-81771 and JP 2-126001, lead has a low elastic coefficient and thus the lead plate is deformed even by a pressure change that does not reach the pressure at which the lead plate ruptures, and repeating of this deformation can cause a bolt hole provided in the lead plate for fastening to stretch. Thus, sealability of the atmosphere relief mechanism declines and the air may enter the interior space of the casing which is maintained at negative pressure during the normal operation. In order to prevent this, the lead plate must be replaced frequently. Moreover, the material of the atmosphere relief plate, lead, is known to be harmful to humans and thus there is a trend to restrict use of this material.

In view of this, an atmosphere relief disc having stacked layers was proposed. The atmosphere relief disc is formed by stacking thin plates made of material such as SUS and fluorine resin.

For instance, described in Japanese Unexamined Patent Application Publication No. 8-226308 is to arrange a rupture disc in an exhaust gas duct for leading exhaust gas from a gas turbine to a boiler furnace. This rupture disc is manufactured by stacking thin plates made of material such as graphite, SUS 316 and Teflon® and is supported between a pair of flange portions formed in the duct.

SUMMARY OF THE INVENTION

1. Technical Problem

The rupture disc like the one described in JP 8-226308 is formed by stacking thin plates made of material such as SUS and Teflon® and thus, it is not preferable to form a bolt hole in the rupture disc from the perspective of maintaining the sealability around the bolt hole. Therefore, as described in JP 8-226308, normally the rupture disc is not formed with a bolt hole and instead, held between flanges or the like to be fixed.

However, in the case where this rupture disc is used for the casing of the rotary machine, if the rupture disc is damaged unintentionally, the rupture disc may not be able to fully satisfy its function to communicate the interior space of the casing with the atmosphere by rupturing at a set pressure (a rupture pressure). Particularly in the case where a slit is formed in the rupture disc so that the rupture disc ruptures at the set pressure, the slit may even tear by repeatedly starting and stopping the rotary machine.

In view of the above issues, it is an object of the present invention to provide a rotary machine provided with an atmosphere relief mechanism capable of preventing unintended damage of a rupture disc as well as a method for installing the atmosphere relief mechanism of the rotary machine.

2. Solution to the Problem

Inventors of the present invention have studied mechanism of how unintended damage of the rupture disc occurs and found out that the mounting structure of the rupture disc to the rotary machine was a cause of the unintended damage of the rupture disc.

FIG. 7 is a drawing showing an example of a mounting structure of the rupture disc to the rotary machine. The atmosphere relief mechanism illustrated in FIG. 7 is formed by an attachment seat 51 provided on the casing of the rotary machine, a sheet gasket 52, a grid panel 53, a sheet gasket 54, a rupture disc 55, a sheet gasket 56, a holding panel 57, and a cover 58 arranged in this order. Further, these parts are fastened together by inserting bolts 59 into bolt holes formed in the cover 58, the holding panel 57, the grid panel 53, the sheet gasket 54 and the attachment sheet 51 and hence the rupture disc 55 is held between the holding panel 57 and the grid panel 53.

According to knowledge of the inventors, the main cause of the unintended damage of the rupture disc 55 is the gap 60 formed on an outer circumference of the rupture disc 55. This gap 60 is formed by holding the outer circumferential edge of the rupture disc 55 between the holding panel 57 and the grid panel 53, based on the design idea that it is no longer necessary to form fastening holes in the rupture disc 55 and also that it is made easy to attain sealability of the rupture disc 55. When the holding panel 57 and the grid panel 53 are fastened together by the bolts 58 with the gap 60 existing therebetween, there is no surface on the outer circumferential side of the bolts 58 to receive load of the holding panel 57. Thus, the outer circumferential edge of the holding panel 57 deforms slightly toward the grid panel 53. As a result, a center part of the holding panel 57 bulges out toward the atmosphere side and accordingly the rupture disc 55 warps (a center part of the rupture disc 55 bulges out toward the atmosphere side). Therefore, the rupture disc 55 becomes damaged before the pressure in the casing reaches the set pressure (a rupture pressure). Particularly, in the case where a slit is formed in the rupture disc 55, the slit is subjected to high stress due to warping of the rupture disc 55 caused by the presence of the gap 60. This may even cause tearing of the slit when attaching the rupture disc 55.

Therefore, a rotary machine according to the present invention comprises a casing; and an atmosphere relief mechanism for closing an opening for atmosphere relief formed in the casing and relieving pressure of inner fluid to atmosphere when a pressure in the casing rises. The atmosphere relief mechanism comprises:

a rupture disc configured to rupture when the pressure in the casing reaches a predetermined pressure;

a pair of annular holding parts arranged to hold an outer edge of the rupture disc from both sides;

a plurality of fastening members for fastening the pair of annular holding parts to each other so as to hold the rupture disc between the pair of annular holding parts; and an annular spacer part provided along an outer circumference of the rupture disc.

According to the above rotary machine, the rupture disc held by the pair of annular holding parts is arranged inside the area where the fastening members are arranged and the annular spacer part is formed along the outer circumference of the rupture disc. As a result, the force applied by the fastening force of the fastening members to the casing side from the annular holding part located on the atmosphere side can be received almost evenly by the rupture disc and the annular spacer part. Therefore, it is possible to prevent deformation of the annular holding part located on the atmosphere side during fastening and also to prevent deformation of the rupture disc. As a result, unintended damage of the rupture disc can be prevented.

In the above rotary machine, a liquid gasket may be provided between the rupture disc and a first holding part of the pair of annular holding parts that is disposed on a side of an interior space of the casing.

In the case of providing the gasket between the rupture disc and the first holding part of the pair of annular holding parts, e.g. a grid panel, a gap corresponding to the thickness of the gasket is formed between the rupture disc and the first holding part. Therefore, if the pressure in the casing changes repeatedly in association with start and stop of the rotary machine, the rupture disc is repeatedly displaced by the amount corresponding to the thickness of the gasket (the amount of the gap between the rupture disc and the first holding part). This can enhance unintended damage of the rupture disc.

In view of this, a liquid gasket which is significantly thinner than a regular sheet gasket is provided as the gasket to be provided between the rupture disc and the first holding part. As a result, it is possible to suppress repeated displacement of the rupture disc in association with start and stop of the rotary machine while maintaining high sealability between the rupture disc and the first holding part. This makes it possible to prevent unintended damage of the rupture disc more effectively.

In the above rotary machine, the annular spacer part may be a plate-like liner formed separately from the pair of annular holding parts.

As the annular spacer part is constituted of the plate-like liner formed separately from the pair of annular holding parts, it is made easier to adjust the thickness of the liner corresponding to the thickness of the rupture disc. As a result, it is possible to prevent unintended damage of the rupture disc effectively.

Further, the liner may have an elastic coefficient approximately the same as or higher than the rupture disc.

In the case where the liner has an elastic coefficient lower than the rupture disc, the liner deforms more than the rupture disc when fastening by the fastening members and this may result in slight deformation of the second holding part. In view of this, the liner is configured to have an elastic coefficient approximately the same as or higher than the rupture disc so as to firmly support the outer circumferential edge of the second holding part. As a result, it is possible to prevent deformation of the second holding part.

In the above rotary machine, the annular spacer part may be a stepped portion formed by an outer rim of one of the pair of annular holding parts protruding toward the other of the pair of annular holding parts.

As the annular spacer part is constituted of the stepped portion, it is possible to prevent unintended damage of the rupture disc. Further, the annular spacer part (the stepped portion) can be formed integrally with the one of the pair of annular holding parts and thus, the number of parts can be reduced.

The present invention provides a method for attaching to a rotary machine an atmosphere relief mechanism which comprises a rupture disc configured to close an opening formed in a casing of the rotary machine and to rupture when a pressure in the casing reaches a predetermined pressure, and a pair of annular holding parts for holding an outer edge of the rupture disc from both sides. The method comprises the steps of:

placing the rupture disc and a liner on a first holding part of the pair of annular holding parts that is disposed on a side of an interior space of the casing;

placing on the rupture disc and the liner, a second holding part of the pair of annular holding parts that is disposed on an atmosphere side; and fastening the pair of annular holding parts to each other by a plurality of fastening members, wherein in the step of placing the rupture disc and the liner, the liner is placed along an outer circumference of the rupture disc.

According to the above method for attaching the atmosphere relief mechanism, the liner is arranged along the outer circumference of the rupture disc and thus, a force applied by a fastening force of the fastening members to the casing side from the second holding part can be received almost evenly by the rupture disc and the liner. Therefore, it is possible to prevent deformation of the second holding part when fastening by the fastening member and also to prevent deformation of the rupture disc. As a result, unintended damage of the rupture disc can be prevented.

3. Advantageous Effects

According to the present invention, it is possible, by providing the annular spacer part (e.g. the liner, the stepped portion or the like) along the outer circumference of the rupture disc, to suppress warping of the rupture disc caused by deformation of the annular holding part disposed on the atmosphere side during fastening by means of the fastening members and also to prevent unintended damage of the rupture disc due to repeated operation of the rotary machine.

DETAILED DESCRIPTION OF THE INVENTION

An embodiment of the present invention will now be described in detail with reference to the accompanying drawings. It is intended, however, that unless particularly specified, dimensions, materials, shape, relative positions and the like of components in this embodiment shall be interpreted as illustrative only and not limitative of the scope of the present invention.

As one example of a rotary machine according to this embodiment of the present invention, a steam turbine provided with an atmosphere relief mechanism is described. However, the rotary machine according to the embodiment of the present invention is not limited to the steam turbine. For instance, it includes other types of rotary machines provided with the atmosphere relief mechanism such as a gas turbine and a compressor.

Figure 1:
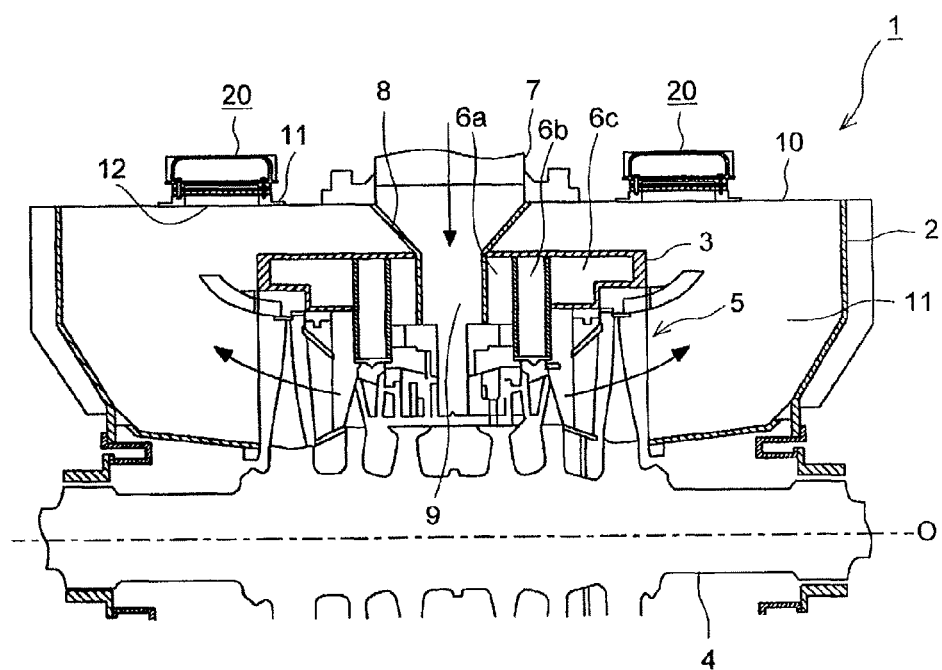
FIG. 1 is a cross-sectional view of a structural example of a steam turbine according to an embodiment of the present invention.

FIG. 1 is a cross-sectional view of a structural example of the steam turbine according to the embodiment of the present invention.

The steam turbine 1 of FIG. 1 is configured such that an inner casing 3 is arranged in an outer casing 2. The steam turbine 1 is a double flow steam turbine in which steam enters a steam inlet flow path 9 located near a center of the casing and then flows in right-hand and left-hand directions. The steam turbine 1 may be a low pressure turbine into which the steam flows after having performed work in a high pressure turbine or an intermediate pressure turbine.

The steam turbine 1 has a rotor 4 which is surrounded by the outer casing 2 and the inner casing 3. The rotor 4 is rotatably supported by a rotor bearing outside the outer casing 2 and multiple stages of the blade rows 5 are provided symmetrically along the axial direction O. These blade rows 5 are covered by the inner casing 3. The inner casing 3 forms extraction rooms 6a, 6b, 6c that are arranged outside the blade rows 5 in the radial direction. These extraction rooms 6a, 6b, 6c are configured to extract steam of prescribed pressure from each row of the multiple stages of blade rows 5 and lead it to outside. The rotor 4 and the inner casing 3 are covered by the outer casing 2. For supplying the steam from the inner casing 3 to the blade rows 5, a steam supply tube 7 and the steam inlet flow path 9 formed by a partition wall 8 are provided. In an interior space of the casing 10 forming an outer shell of the outer casing 2, an exhaust chamber 11 where the steam having passed through the multiple stages of the blade rows 5 (exhaust gas) is exhausted. The exhaust chamber 11 communicates with a condenser (not shown) and is maintained vacuum during the normal operation.

In abnormal situations such as when the steam leaks from a piping or there is pump failure in a negative-pressure system arranged from the exhaust chamber 11 to the condenser, etc., the pressure in the exhaust chamber 11 can increase abnormally. Therefore, an atmosphere relief mechanism 20 is provided in the casing 10 so as to relieve the steam inside the exhaust chamber 11 to the atmosphere at the time of the abnormal pressure rise in the exhaust chamber 11. The atmosphere relief mechanism 20 is arranged to cover an opening 12 of the casing 10 formed in the casing 10. For instance, the atmosphere relief mechanism 20 may be provided at four places on a top surface of the casing 10.

Figure 2:
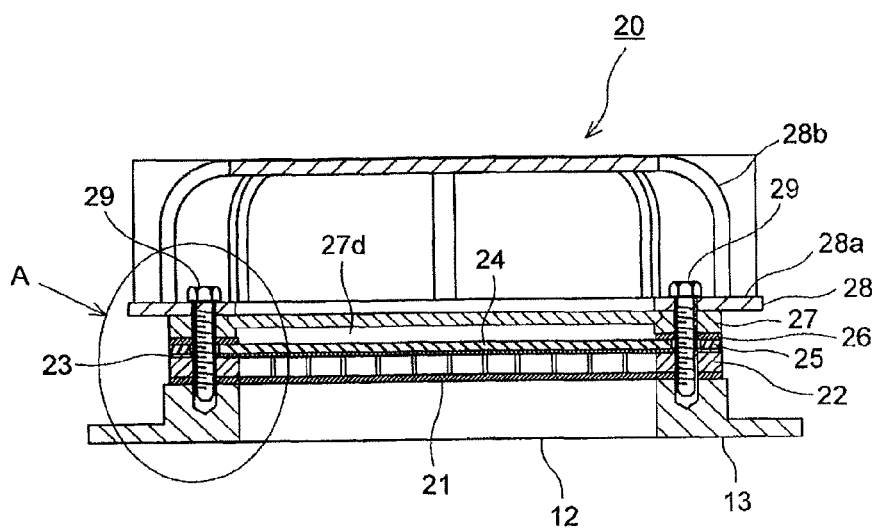
FIG. 2 is a cross-sectional view of a structural example of an atmosphere relief mechanism according to the embodiment of the present invention.
Figure 3:
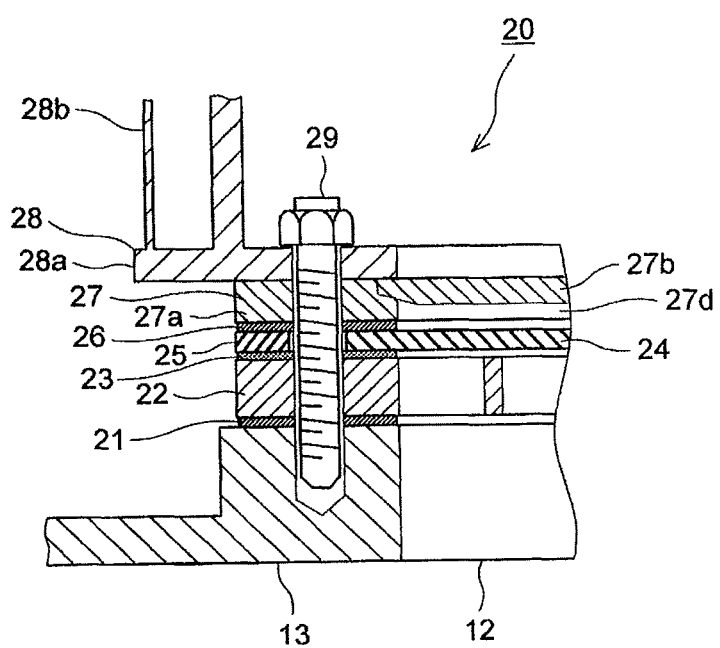
FIG. 3 is an enlarged view of portion B of the atmosphere relief mechanism of FIG. 2.
Figure 4:
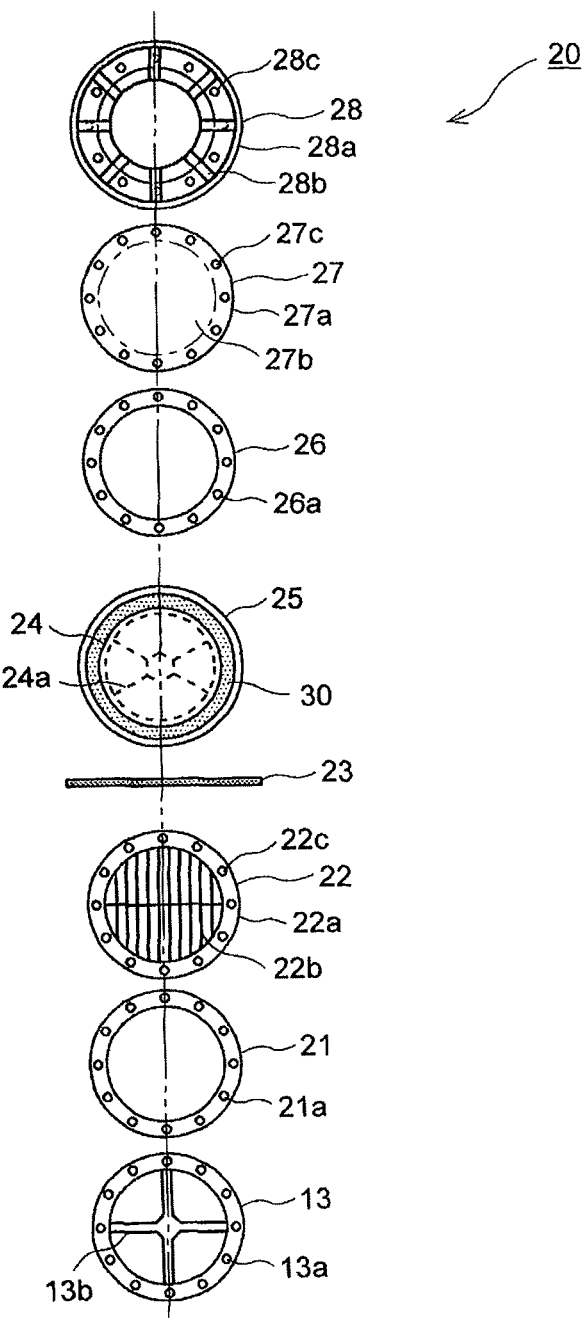
FIG. 4 is a plan view of members constituting respective layers of the atmosphere relief mechanism which are illustrated in the order of the layers.

In reference to FIG. 2 through FIG. 4, a detailed structure of the atmosphere relief mechanism 20 is explained. FIG. 2 is a cross-sectional view of a structural example of the atmosphere relief mechanism according to the embodiment of the present invention. FIG. 3 is an enlarged view of portion A of the atmosphere relief mechanism of FIG. 2. FIG. 4 is a plan view of members constituting respective layers of the atmosphere relief mechanism that are illustrated in the order of the layers.

As illustrated in FIG. 2 and FIG. 3, the atmosphere relief mechanism 20 has a layered structure having a plurality of members stacked together. The atmosphere relief mechanism 20 is arranged on a pedestal 13 which is provided on the casing 10 to form an opening 12 for atmosphere relief. The atmosphere relief mechanism 20 may be formed by a gasket 21, a grid panel 22, a gasket 23, a rupture disc 24, a liner 25, a gasket 26, a holding panel 27 and a cover 28 which are arranged in this order from the exhaust chamber 11 side toward the atmosphere. Further, the layers of the atmosphere relief mechanism 20 are fastened to each other by means of fastening members constituted by bolts 29 and fixed to the casing 10.

Each layer of the atmosphere relief mechanism is explained in detail with reference to FIG. 4.

The pedestal 13 projects from the casing 10 toward the atmosphere side and its projecting portion has a flat annular top surface. The atmosphere relief mechanism 20 is placed on the top surface of the projecting portion of the pedestal 13 (the flat annular surface). In the pedestal 13, a plurality of bolt holes 13a are provided along an outer circumference of the opening 12. The bolts 29 (see FIG. 2, FIG. 3) are screwed into the bolt holes 13a. Further, the pedestal 13 may have a rib 13b provided to traverse the opening 12.

The gasket 21 is formed into a circular shape and is used for the purpose of improving the sealability by being interposed between the pedestal 13 and the grid panel 22. As the gasket 21, a sheet gasket is preferably used. For instance, a flexible gasket, a metal gasket, a semi-metal gasket, or the like are used. In this gasket 21 as well, bolt holes 21a are formed corresponding to the bolt holes 13a of the pedestal 13. Further, this gasket 21 may be omitted.

The grid panel 22 includes an annular holding part 22a constituting a first holding part, a grid part 22b provided in an opening of the annular holding part 22a, and a plurality of bolt holes 22c formed corresponding to the bolt holes 13a of the pedestal 13. This grid panel 22 is provided so that the rupture disc 24 is prevented by the grid part 22b from bending toward the exhaust chamber 11 side when the inside of the exhaust chamber 11 is evacuated.

The gasket 23 is formed into a circular shape and is provided between the grid panel 22 and the rupture disc 24 and the liner 25 to improve the sealability. Further, the gasket 23 is provided for the purpose of forming a precise flat surface for the rupture disc 24 and the liner 25 to be placed on. The gasket 23 may have the same configuration as the gasket 21. However, from the perspective of reducing the gap between the grid panel 22 and the holding panel 27, a liquid gasket which can be formed thinner than the sheet gasket is preferably used. As the liquid gasket, a liquid gasket of silicone type may be used, for instance. Further, the liquid gasket may be provided only on an inner circumferential side of the bolts 29 or on both the inner and outer circumferential sides of the bolts 29.

The rupture disc 24 is formed into a circular shape and has a plurality of slits 24a. The rupture disc 24 is configured to rupture when the pressure reaches a prescribed rupture pressure. For instance, the rupture disc 24 may be configured by interposing a fluorine contained resin sheet securing the sealability between stainless thin panels formed with slits. In the case of application to the low pressure steam turbine 1 as described in this embodiment, the rupture disc 24 configured to rupture at pressure slightly above the atmospheric pressure may be used. This rupture disc 24 contacts the annular holding part 22a of the grid panel 22 via the gasket 23 at an outer circumferential edge on the exhaust chamber 11 side and contacts an outer circumferential edge of the holding panel 27 via the gasket 26 at an outer circumferential edge on the atmosphere side. Further, the rupture disc 24 is held between the grid panel 22 and the holding panel 27 by means of the bolts 29 to be fixed to the casing 10.

The bolt holes formed for the bolts 29 are not formed in the rupture disc 24 itself and the bolts 29 are arranged on an outer circumferential side of the rupture disc 24 to avoid the rupture disc 24. In an area 30 (a fastening member arrangement area) where the bolts 29 are arranged is an annular-shaped area between the rupture disc 24 and the liner 25 which is described next. More specifically, in the fastening member arrangement area 30, neither the rupture disc 24 nor the liner 25 is provided and a space is formed for the bolts 29 to pass through. Further, the bolt holes of the members of the layers other than the rupture disc 24 and the liner 25 (13a, 21a, 22c, 26a, 27c, 28c) are respectively provided corresponding to the fastening member arrangement area 30 so that the bolts 29 passing through the fastening member arrangement area 30 can be screwed into these bolt holes.

The liner 25 constitutes an annular spacer part and is arranged on an outer circumferential side of the fastening member arrangement area 30 to surround the outer circumference of the rupture disc 24. Further, the liner 25 has thickness which corresponds to thickness of the rupture disc 24. More specifically, the liner 25 may be approximately as thick as the rupture disc 24 or slightly thinner than the rupture disc 24 to make it easier to transmit a fastening force by the bolts 29 to the rupture disc 24 side.

Furthermore, the liner 25 may be made of material having an elastic coefficient approximately the same as or higher than the rupture disc 24, preferably metal material. For instance, in the case that SUS316 is used as the main material of the rupture disc 24, SS400 can be used for the liner 25. In this manner, the liner 25 has an elastic coefficient approximately the same as or higher than the rupture disc 24 and thus the outer circumferential edge of the holding panel 27 can be securely held toward the casing 11 side by the liner 25, thereby preventing deformation of the holding panel 27.

The gasket 26 is formed into a circular shape and is provided between the rupture disc 24 and the holding panel 27. The gasket 26 is used for the purpose of improving the sealability between the rupture disc 24 and the holding panel 27. The gasket 26 has almost the same configuration as the gasket 21 and has a plurality of bolt holes 26a at positions corresponding to the bolt holes of the members of other layers. Further, this gasket 26 may be omitted The holding panel 27 includes an annular holding part 27a constituting a second holding part, a lid part 27b for covering an atmosphere-side surface of the annular holding part, and a plurality of bolt holes 27c formed at positions corresponding to the bolt holes of the members of other layers. This holding panel 27 is configured to form a space 27d by the annular holding part 27a and the lid part 27b on a side facing the rupture disc 24 (see FIG. 3). When the pressure in the exhaust chamber 11 reaches the prescribed pressure (e.g. during abnormal temperature rise), the rupture disc 24 bulges out in the space 27d and hence ruptures. The lid part 27b is provided for the purpose of preventing the rupture disc 24 from being broken by a fallen object from outside, or the like. However, the lid part 27b may be omitted.

The holding panel 27 itself may be omitted. In this case, the second holding part is constituted by a flange part 28a of the cover 28 described later. The cover 28 includes the flange part 28a, a frame 28b provided to traverse the opening of the flange part 28a, and a plurality of bolt holes 28c formed in the flange part 28a at positions corresponding to the bolt holes of the members of other layers.

As illustrated in FIG. 2 and FIG. 3, the bolts 29 constituting the fastening member are screwed into the holes 13a of the pedestal 13 through respective bolt holes of the holding panel 27, the gasket 26, the grid panel 22 and the gasket 21. By the fastening force of the bolts 29, the above-described components are fixed to the casing 10 side and also the rupture disc 24 and the liner 25 are held between the grid panel 22 and the holding panel 27 so as to be fixed to the casing 10 side.

In this process, the force applied by the fastening force of the bolts from the holding panel 27 to the casing 10 side can be received almost evenly by the rupture disc 24 on the inner circumferential side of the bolts 29 and by the liner 25 on the outer circumferential side of the bolts 29. Thus, it is possible to prevent deformation of the holding panel 27 and deformation of the rupture disc 24 when being fastened. Therefore, in the atmosphere relief mechanism 20 of this embodiment, it is possible to prevent unintended damage of the rupture disc 24.

Figure 5:
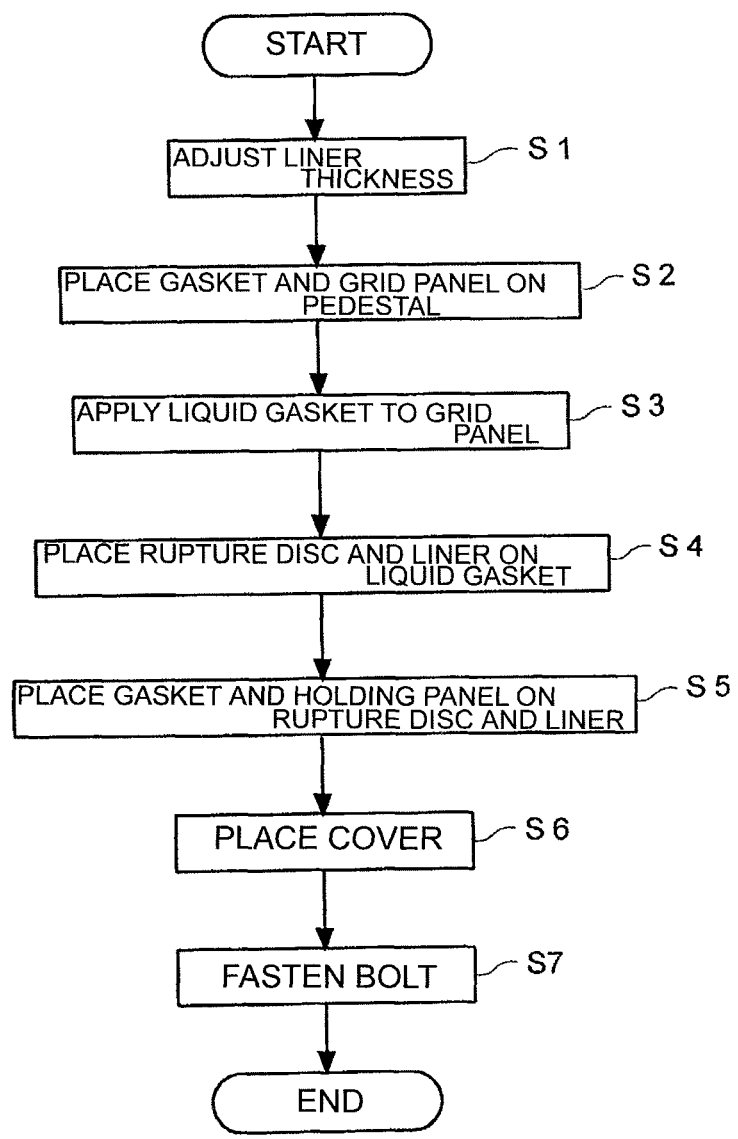
FIG. 5 is a flow chart of an example of a mounting method of the atmosphere relief mechanism according to the embodiment of the present invention.

Next, in reference to FIG. 5, a method for attaching the atmosphere relief mechanism 20 is explained. FIG. 5 is a flow chart of an example of a mounting method of the atmosphere relief mechanism according to the embodiment of the present invention.

The thickness of the liner 25 is adjusted corresponding to the thickness of the rupture disc 24 (S1). More specifically, the thickness of the liner 25 is adjusted to the same thickness or slightly smaller than the thickness of the rupture disc 24. Then, the gasket 21 and the grid panel 22 are placed on the pedestal 13 provided on the casing 10 (S2). On this grid panel 22, the liquid gasket is applied as the gasket 23 (S3). On this liquid gasket, the rupture disc 24 and the liner 25 whose thickness has been adjusted are placed (S4). Then, on the rupture disc 24 and the liner 25, the gasket 26 and the holding panel 27 are placed (S5), and the cover 28 is placed on this holding panel 27 (S6). Further, when stacking these members, positions of respective bolt holes are matched. Finally, the bolts 29 are inserted in the bolt holes and these members are fastened to the casing 10 (S7).

As described above, according to this embodiment, the annular spacer part (the liner 25) having the thickness corresponding to that of the rupture disc 24 is provided outside the fastening member arrangement area 30. As a result, it is possible to suppress warping of the rupture disc 24 caused in association with deformation of the holding panel 27 during fastening by means of the bolts 29 and thus it is possible to prevent unintended damage of the rupture disc 24.

By using the thin liquid gasket as the gasket 23 to be interposed between the rupture disc 24 and the grid panel 22, it is possible to suppress repeated displacement of the rupture disc 24 in association with start and stop of the steam turbine while maintaining high sealability between the rupture disc 24 and the grid panel 22. As a result, it is possible to prevent unintended damage of the rupture disc 24 more effectively.

Figure 6:
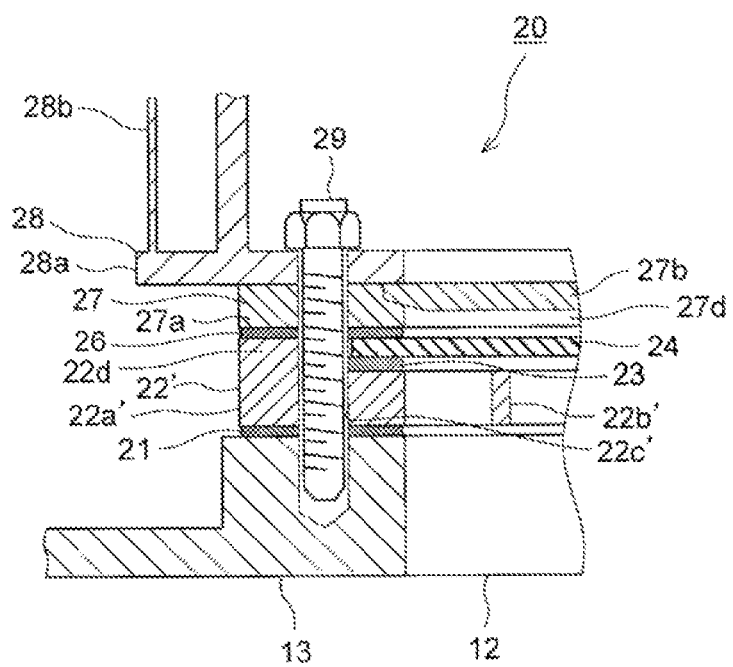
FIG. 6 is a cross-sectional view of a modified example of the atmosphere relief mechanism according to the embodiment of the present invention.
Figure 7:
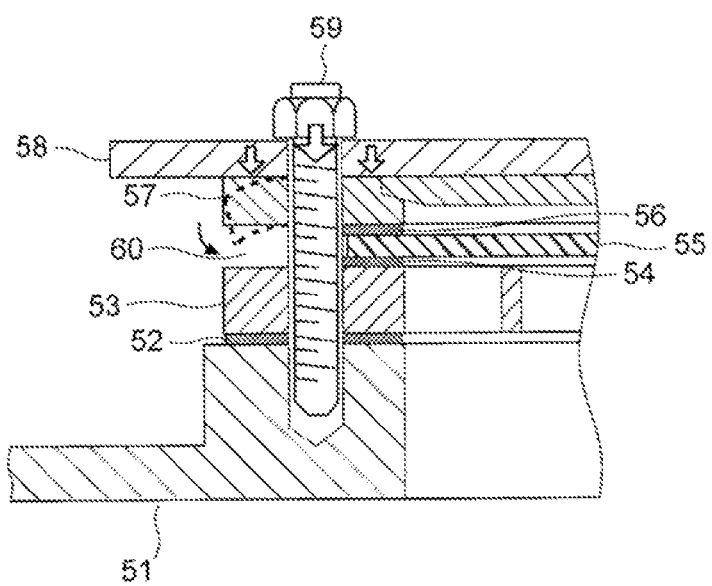
FIG. 7 is an explanatory drawing of a cause of rupture of a rupture disc of the atmosphere relief mechanism.

Further, in the above embodiment, the liner 25 is used as the annular spacer. However, this is not limitative and instead of the liner 25, a stepped portion 22d may be used as the annular spacer as illustrated in FIG. 6. FIG. 6 is a cross-sectional view of a modified example of the atmosphere relief mechanism according to this embodiment of the present invention.

In the atmosphere relief mechanism 20' according to this modified example, a grid panel 22' includes an annular holding part 22a' constituting the first holding part, a grid part 22b', bolt holes 22c' and a stepped portion 22d. The stepped portion 22d is formed by an outer part of the annular holding part 22a' which is on the outer circumferential side of the bolt holes 22c' and the outer part protrudes toward the rupture disc 24. A surface of the stepped portion 22d on the rupture disc 24 side forms a flat surface contacting the holding panel 27 via the gasket 26. Further, the stepped portion 22d is formed to have a height corresponding to height of the rupture disc 24.

As the annular spacer part is constituted of the stepped portion 22d, it is possible to suppress warping of the rupture disc 24 caused in association with deformation of the holding panel 27 during fastening by means of the bolts 29 and thus it is possible to prevent unintended damage of the rupture disc 24. Further, it is possible to provide the annular spacer part (the stepped portion 22d) integrally with the grid panel 22' and thus, the number of parts can be reduced.

Further, the stepped portion 22d is formed in the grid plate 22' in the configuration illustrated in FIG. 6. However, the stepped portion may be formed in the holding panel 27. In this case, the gasket 26 is omitted or the liquid gasket is provided as the gasket 26.

While the embodiment of the present invention has been described in detail, it is obvious that various modifications and changes may be made without departing from the gist of the invention.

For instance, in the above embodiment, the atmosphere relief mechanisms 20, 20' having the stacked layer structure as illustrated in FIG. 4 and FIG. 6 are described. However, the stacked layer structure of the atmosphere relief mechanism is not limited to this as long as it is configured so that the outer circumferential edge of the rupture disc 24 is held from both sides by a pair of annular holding parts and fastened by a fastening member (e.g. the bolts 29) and the annular spacer part (the liner 25 and the stepped portion) is provided outside the fastening member arrangement area 30.

The invention claimed is:

1. A rotary machine comprising:
    a casing; and
    an atmosphere relief mechanism for closing an opening for atmosphere relief formed in the casing and relieving pressure of inner fluid to atmosphere when a pressure in the casing rises,
    wherein the atmosphere relief mechanism comprises:
    a rupture disc configured to rupture when the pressure in the casing reaches a predetermined pressure;
    a pair of annular holding parts arranged to hold an outer edge of the rupture disc from both sides;
    a plurality of fastening members for fastening the pair of annular holding parts to each other so as to hold the rupture disc between the pair of annular holding parts, the plurality of fastening members being arranged in a fastening member arrangement area which is disposed on an outer circumferential side of the rupture disc; and
    an annular spacer part provided along an outer circumference of the rupture disc, and
    wherein the annular spacer part is a plate-like liner formed separately from the pair of annular holding parts,
    wherein the fastening member arrangement area is an annular-shaped area between the rupture disc and the liner.

2. The rotary machine according to claim 1, wherein between the rupture disc and a first holding part of the pair of annular holding parts that is disposed on a side of an interior space of the casing, a liquid gasket is provided.

3. The rotary machine according to claim 2, wherein the liner has elastic coefficient approximately the same as or higher than the rupture disc.

4. The rotary machine according to claim 1, wherein the plate-like liner has an elastic coefficient approximately the same as or higher than the rupture disc.

5. A rotary machine comprising:
    a casing; and
    an atmosphere relief mechanism for closing an opening for atmosphere relief formed in the casing and relieving pressure of inner fluid to atmosphere when a pressure in the casing rises,
    wherein the atmosphere relief mechanism comprises:
    a rupture disc configured to rupture when the pressure in the casing reaches a predetermined pressure;
    a pair of annular holding parts arranged to hold an outer edge of the rupture disc from both sides;
    a plurality of fastening members for fastening the pair of annular holding parts to each other so as to hold the rupture disc between the pair of annular holding parts, the plurality of fastening members being arranged in a fastening member arrangement area which is disposed on an outer circumferential side of the rupture disc; and
    an annular spacer part provided along an outer circumference of the rupture disc, and
    wherein the annular spacer part is a stepped portion formed by an outer rim of one of the pair of annular holding parts protruding toward the other of the pair of annular holding parts on an outer circumferential side of the fastening members,
    wherein the fastening member arrangement area is an annular-shaped area between the rupture disc and the stepped portion.

6. The rotary machine according to claim 5, wherein the stepped portion is formed to have a height corresponding to thickness of the rupture disc.

7. The rotary machine according to claim 6, wherein a holding part of the pair of annular holding parts that is disposed on a side of an interior space of the casing is formed separately from the casing.

8. The rotary machine according to claim 5, wherein a holding part of the pair of annular holding parts that is disposed on a side of an interior space of the casing is formed separately from the casing.

9. A method for attaching to a rotary machine an atmosphere relief mechanism which comprises a rupture disc configured to close an opening formed in a casing of the rotary machine and to rupture when a pressure in the casing reaches a predetermined pressure, and a pair of annular holding parts for holding an outer edge of the rupture disc from both sides, the method comprising the steps of:

placing the rupture disc and a liner on a first holding part of the pair of annular holding parts that is disposed on a side of an interior space of the casing;

placing on the rupture disc and the liner, a second holding part of the pair of annular holding parts that is disposed on an atmosphere side; and fastening the first holding part and the second holding part to each other by a plurality of fastening members arranged in a fastening member arrangement area which is disposed on an outer circumferential side of the rupture disc and which is an annular-shaped area between the rupture disc and the liner, wherein in the step of placing the rupture disc and the liner, the liner is placed along an outer circumference of the rupture disc.

* * * * *